(12) United States Patent
Hussain et al.

(10) Patent No.: US 6,545,679 B1
(45) Date of Patent: Apr. 8, 2003

(54) VIEW VOLUME CLIP-CHECK IN OBJECT SPACE

(75) Inventors: Zahid Hussain, San Jose, CA (US); Gianpaolo Tommasi, San Carlos, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/473,210

(22) Filed: Dec. 27, 1999

(51) Int. Cl.[7] ............................................... G06T 15/10
(52) U.S. Cl. ...................................................... 345/427
(58) Field of Search ................................ 345/427, 620, 345/622, 623, 625

(56) References Cited

U.S. PATENT DOCUMENTS 6,064,393 A * 5/2000 Lengyel et al. ............. 345/427

* cited by examiner

Primary Examiner—Michael Razavi
Assistant Examiner—G. F. Cunningham
(74) Attorney, Agent, or Firm—Woodcock Washburn LLP

(57) ABSTRACT

The present invention is drawn to a method for performing view volume clip-check. Until the present invention, view volume clip-check has been performed within the context of a clip space with its clip coordinates. However, the present invention performs view volume clip-check within an object space with its object coordinates. In one embodiment of the present invention, a frustum in a clip space is back projected into an object space as the back projected frustum. Within the object space, a regularized volume approximates the back projected frustum such that the regularized volume occupies the maximal volume possible within the back projected frustum. Within the object space, geometry of graphics objects is then clip-checked against this regularized volume. In the present embodiment, the above steps of back projection, approximation and clip-checking are performed by the CPU rather than by the graphics pipeline. In so doing, the present invention is able to overcome problems in prior art approaches for clip-checking and clipping.

22 Claims, 12 Drawing Sheets

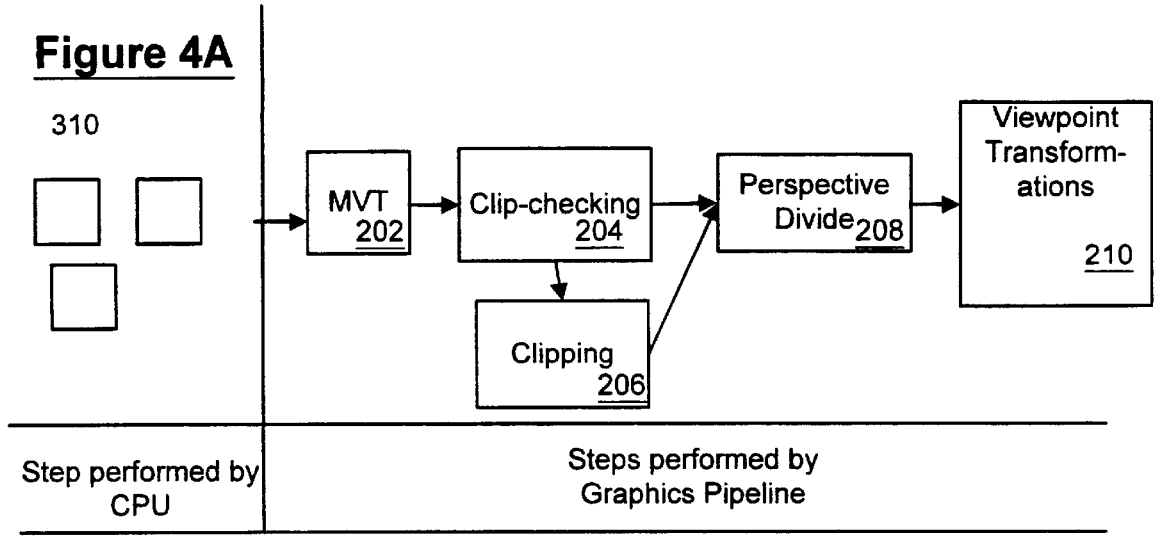
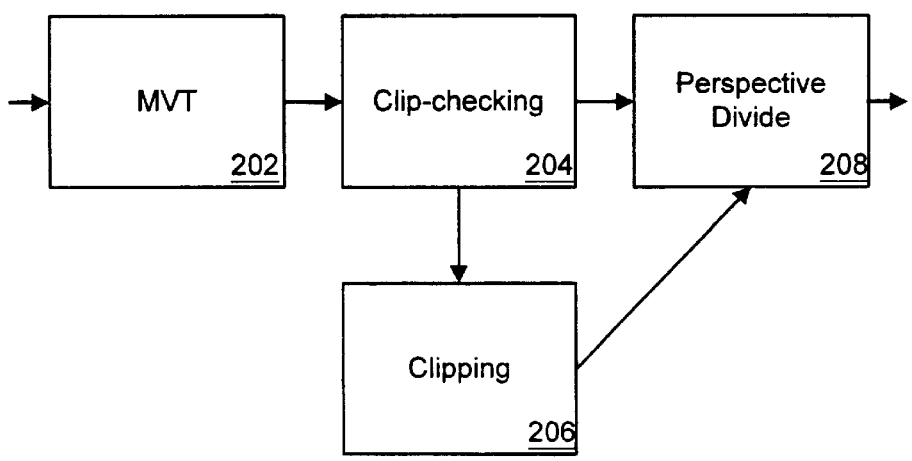

VIEW VOLUME CLIP-CHECK IN OBJECT SPACE

FIELD OF THE INVENTION

The present invention is related to a computer graphics system. More specifically, the present invention is related to view volume clip-check by a computer graphics system.

BACKGROUND OF THE INVENTION

Clipping and Clip-checking

In a computer graphics system, the final two dimensional images being displayed are generated from raw three dimensional data through a sequence of processing steps. These three dimensional data include locations and geometry information about graphics objects and a hypothetical viewer. Typically, these three dimensional data are first stored in object coordinates of an object space, wherein graphics objects are represented independent of the viewer. Then, graphics objects and the viewer are transformed into a different space (with different coordinates) in order to relate these graphics objects to the viewer. In so doing, these graphics objects will be displayed as if seen through the eyes of the viewer. Next, graphics objects are clipped to fit the viewing volume of the viewer because what the viewer will see is finite in scope. Finally, the remaining three dimensional data undergo further processing steps to become two dimensional images stored in a frame buffer right before these two dimensional images are displayed.

In particular, the process of clipping geometry of graphics objects to fit the viewing volume actually involves at least three steps: transformation of the object space, clip-checking and clipping. The first step involved is called model view projection (MVP). Typically, clip-checking is not done in the object space even though three dimensional data are initially represented in object coordinates within the object space. Various transformations collectively called MVP is performed on the object space to create what is called a clip space. In so doing, the mathematical operations of clip-checking are reduced to simplified forms, thus facilitating the efficiency of clip-checking.

The second step involved is called clip-checking. In the clip-checking step, geometry of graphics objects is compared with the viewing volume of the viewer. Or more specifically, geometry of graphics object is compared with the frustum of the viewing volume. The motivation here is that the viewer sees only what is inside of the frustum: anything outside of the frustum will not be needed to generate the final two dimensional images. Thus, anything outside of the frustum is excluded (culled away) from undergoing further unnecessary processing. Also during clip-checking, if a certain portion of the geometry of graphics objects protrudes outside of the frustum, that certain portion will be designated as "to be clipped away." The designated protruding portion will then be clipped away during the third step: the clipping step. Accordingly, this clipping step is performed within the clip space.

Prior Art Implementations of Clip-checking and Clipping

In a computer graphics system, the processing steps are allocated between the CPU (central processing unit) and the graphics pipeline. Specifically, the graphics pipeline is implemented to perform processing steps that are particularly well suited in a forward flow manner. In so doing, the graphics pipeline offsets the CPU's graphic processing load. As a result, the processing steps can be efficiently performed, thus improving the overall throughput of the computer graphics system.

In one prior art approach, clipping is incorporated as a part of a graphics pipeline. Unfortunately, clipping is "expensive" to perform within the graphics pipeline because clipping involves algorithms with branching behaviors. These branching behaviors from clipping algorithms clash against forward flow characteristics of any pipeline architecture. Moreover, clipping requires continual fetching and updating three dimensional data such as vertices of graphics objects represented within the object space. As such, if clipping is designed as a part of the graphics pipeline, the bus coupling the CPU and the graphics pipeline will be burdened with fetching and updating three dimensional data between the CPU and the graphics pipeline. In fact, bus bandwidth could be severely decreased by data communication between the CPU and the graphics pipeline, thus making bus congestion likely.

In another prior art approach, clipping is moved from the graphics pipeline to the CPU. By relying on the CPU to perform clipping, this approach solves the above problem of using a graphics pipeline's forward flow method to perform algorithms with branching behaviors. This approach also solves the above problem of congesting the bus. However, this prior art approach in turn introduces new problems of its own.

One new problem is over-burdening the CPU of the computer graphics system. Importantly, the CPU is not only over-burdened simply because it performs the extra processing of clipping that used to be performed by the graphics pipeline. The CPU is over-burdened at least for two additional reasons. First, in order to clip geometry of graphics objects to fit within the frustum, clip-checking is performed prior to clipping. But because clipping is performed by the CPU, and because clip-checking is performed prior to clipping, clip-checking is also performed by the CPU and not performed by the graphics pipeline. Second, in order to clip-check graphics objects, graphics objects in object coordinates are first transformed by a MVP matrix into graphics objects in clip coordinates within a clip space. Specifically, performing clip-checking within the clip space simplifies the mathematical operations of clip-checking geometry. As such, the CPU also performs MVP matrix multiplications in addition to clip-checking and clipping. Accordingly, in this prior art approach, the CPU not only is performing clipping, but also MVP matrix multiplication and clip-checking prior to clipping. Thus, the CPU is over-burdened. And, throughput of the computer graphics system is decreased.

Furthermore, another problem with this prior art approach is under-utilization (or waste) of the graphics pipeline's processing capability and strength. Specifically, as mentioned above, MVP matrix multiplication is now also designed to be performed by the CPU instead of the graphics pipeline. However, matrix multiplication is particular well suited for forward flow processing modal of the graphics pipeline. As such, performing matrix multiplication by the CPU does not take advantage of the graphics pipeline's efficiency in performing matrix multiplication. Thus, the graphics pipeline's processing capability is under-utilized. And again, throughput of the computer graphics system is decreased.

Thus, a need exists for a computer graphics system to perform clipping without disrupting the graphics pipeline by branching behavior of the clipping algorithms. A need also exists for a computer graphics system to perform clipping without decreasing the bus bandwidth between the CPU and the graphics pipeline. A further need exists for a computer graphics system to perform clipping without over-burdening the CPU. Yet still a need exists for a computer graphics system to perform clipping without under-utilizing the processing capability of the graphics pipeline.

Fortunately, as will be explained in the following pages, the present invention successfully answers all of the needs stated above with a new approach to clip-checking.

SUMMARY

The present invention is drawn to a method and a system for performing view volume clip-check. Until the present invention, view volume clip-check by a computer graphics system had been performed within the context of a clip space with its clip coordinates. However, the present invention performs view volume clip-check within an object space with its object coordinates. In so doing, the present invention overcomes the problems of the prior art approaches in clipping. In particular, the present invention performs clipping without disrupting forward flow of the graphic pipeline. Moreover, the present invention performs clipping without wasting bus bandwidth. Furthermore, the present invention performs clipping without over-burdening the CPU. Further yet still, the present invention performs clipping without under utilizing the graphic pipeline. In addition, the present invention retains the mathematical simplicity of clip-checking even in the context of the object space. Consequently, throughput of the computer graphics system is advantageously increased.

In one embodiment of the present invention, a frustum (within a view volume) in a clip space is back projected into an object space as a back projected frustum. Within the object space, a regularized volume approximates the back projected frustum such that the regularized volume occupies most of the back projected frustum. Then, geometry of graphics objects is clip-checked against this regularized volume within the object space. Clipping is performed if clip-checking indicates that clipping is required on this geometry of graphics objects. Model view projection (MVP) is performed following clip-checking if no clipping is indicated; MVP is performed following clipping if clipping is indicated.

All in all, the present embodiment departs from the prior art methodology of clip-checking. The new clip-checking methodology of the present embodiment in turn enables advantageous arrangement of graphics processing steps. Specifically, back projection, clip-checking and clipping are all performed by the CPU rather than by the graphics pipeline. Thus advantageously, branching behaviors of clipping do not disrupt forward flow characteristic of the graphics pipeline. Also, bus bandwidth is not wasted on passing clipping data between the graphics pipeline and the CPU.

On the other hand, MVP is performed by the graphics pipeline rather than by the CPU. Thus advantageously, the CPU is not burdened with performing a step (i.e., matrix multiplication of MVP) that is particularly well suited for the graphics pipeline's forward flow processing approach. Also, the pipeline is used to its full capability by performing MVP.

Furthermore, in the present embodiment, using the regularized volume for clip-checking retains all of the benefits provided by the prior art approaches for clip-checking. Through the regularized volume within the object space, the mathematical simplicity of performing clip-checking within the clip space (prior art) is still retained in clip-checking within the object space.

These and other objects and advantages of the present invention will no doubt become obvious to those of ordinary skill in the art after having read the following detailed description of the preferred embodiments which are illustrated in the various drawing figures.

BRIEF DESCRIPTION OF THE FIGURES

The accompanying drawings which are incorporated in and form a part of this specification, illustrate embodiments of the invention and together with the description, serve to explain the principles of the invention:

FIG. 4A depicts the design of one prior art approach.

FIG. 4B depicts a specific local arrangement of processing steps in accordance with the prior art approach of FIG. 4A.

DETAILED DESCRIPTION OF THE FIGURES

Reference will now be made in detail to the preferred embodiments of the invention, a computer graphics system and process for clip-checking a view volume in an object space, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

A Generic Computer Graphics System

Figure 1:
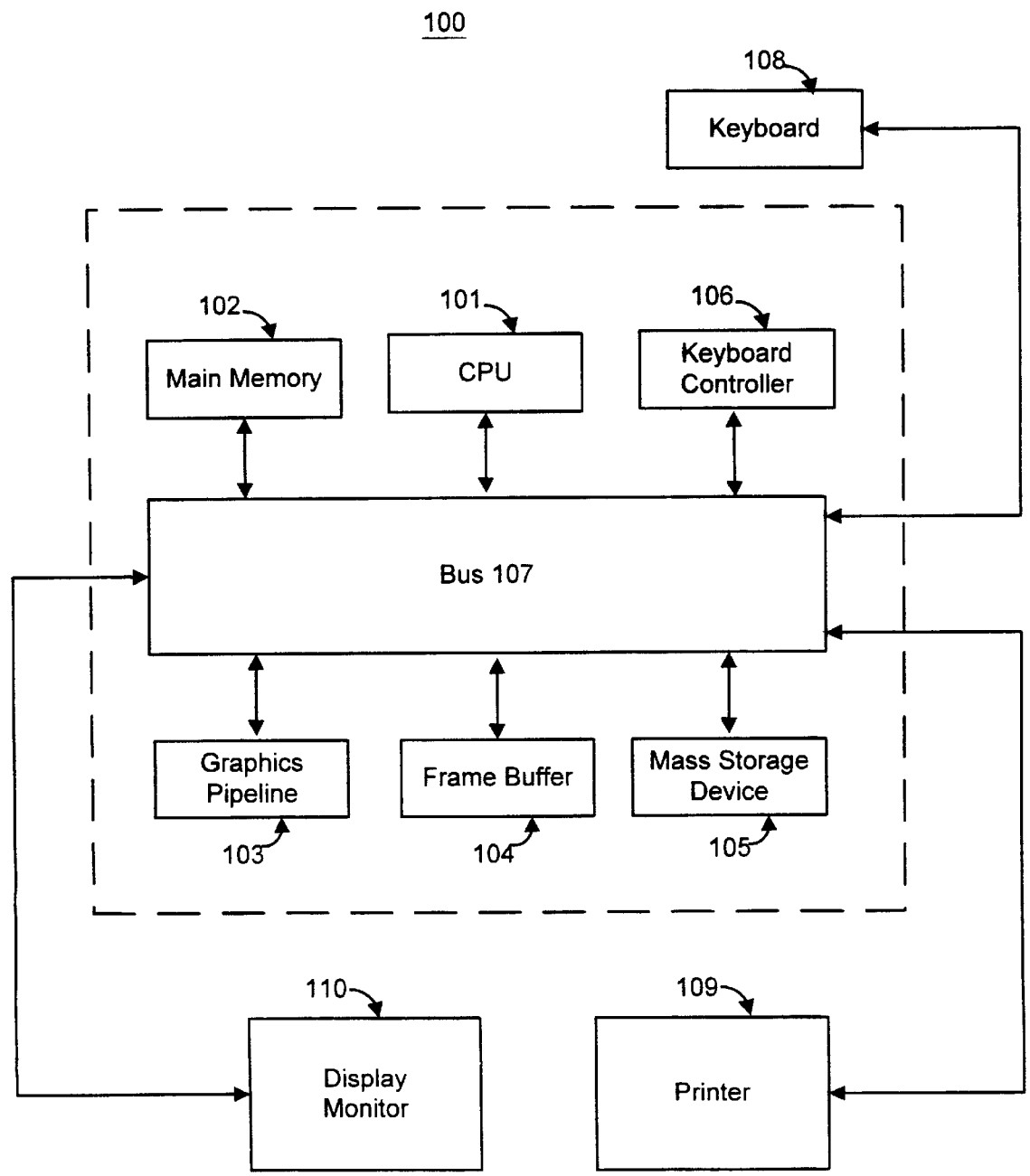
FIG. 1 depicts a typical computer graphics system.

FIG. 1 shows a schematic diagram of one embodiment of a computer graphics system 100. Computer graphics system 100 comprises a central processing unit (CPU) 101, a main memory 102, graphics pipeline 103, frame buffer 104, mass storage device 105, keyboard controller 106, keyboard 108, printer 109 and display monitor 110, all of which are coupled to bus 107. CPU 101 handles most of the control and data processing. Main memory 102 provides. a convenient method of storing data for quick retrieval by CPU 101. Graphics pipeline 103 processes image data in pipelined stages. Frame buffer 104 stores pixel parameter values. Mass storage device 105 stores data associated with multiple images and applications. Keyboard controller 106 controls keyboard 108, which operates as an input device. Printer 109 prints hard copies of graphical images and display monitor 110 displays graphical images.

Processing Steps of a Computer Graphics System

Figure 2:
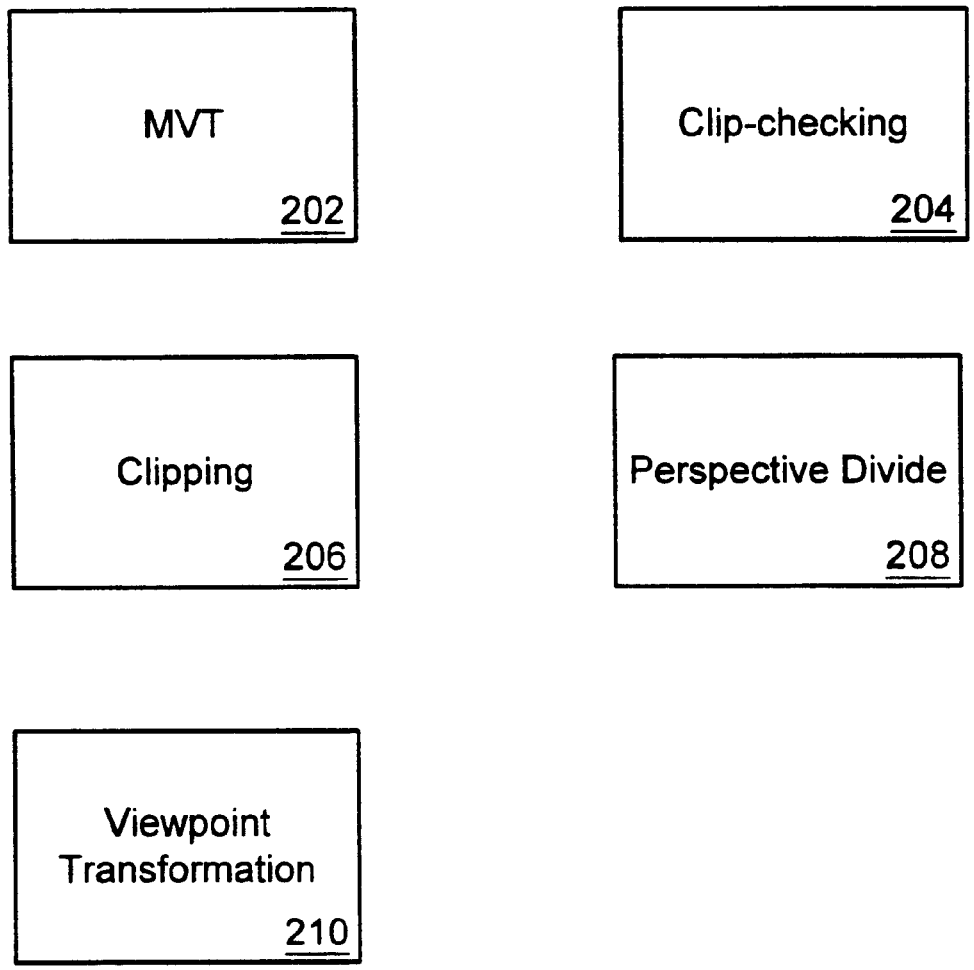
FIG. 2 depicts a typical list of processing steps performed by the computer graphics system.

Referring now to FIG. 2, some examples of processing steps performed by computer graphics system 100 are depicted. Only processing steps that are pertinent to the discussion of the present invention are depicted here in FIG. 2. Many more variety of processing steps can be performed by the computer graphics system but are not shown in FIG. 2. The processing steps shown are model view projection 202 (MVP 202), clip-checking 204, clipping 206, perspective divide 208, viewport transformation 210. Specifically, MVP 202, clip-checking 204 and clipping 206 will be the center piece of the following discussion. Before giving a detailed description for these processing steps, how they are to be performed in relation to one another is discussed next.

Framework for Arranging Processing Steps

Figure 3A:
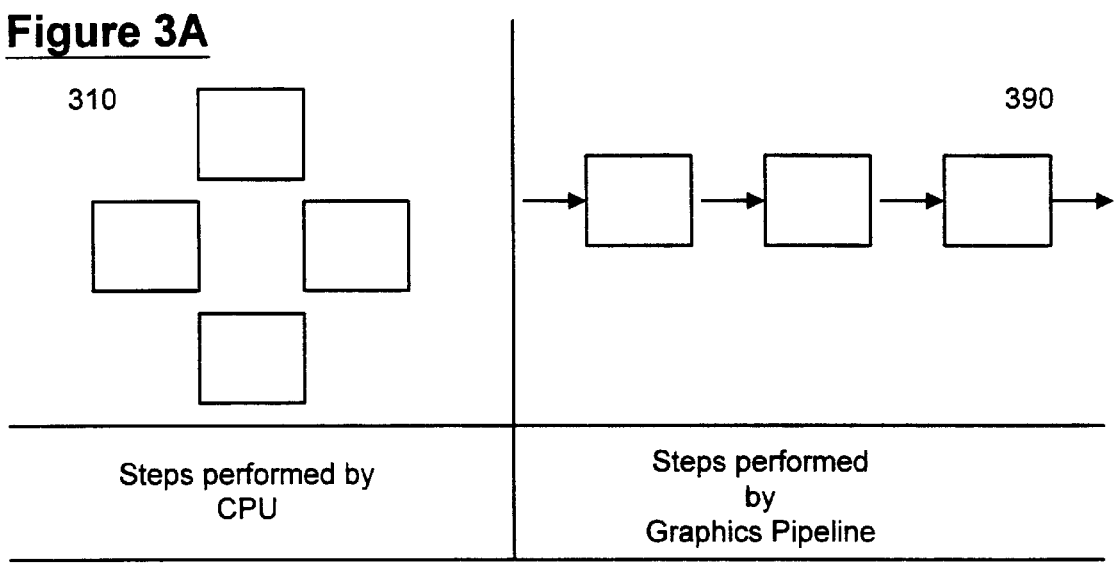
FIG. 3A depicts processing steps of the computer graphics system as classified into two groups.

Referring now to FIG. 3A, steps to be performed by a computer graphics system are classified into two groups as depicted: a first group 310 is comprised of steps performed by CPU 101, and a second group 390 is comprised of steps performed by graphics pipeline 103. Typically, steps belonging to first group 310 can be performed by CPU 101 in different orders for responding to different situations; thus, these steps are depicted with no apparent ordering relations among themselves. On the other hand, steps belonging to second group 390 are performed by graphics pipeline 103 in a fixed order because of the forward flow characteristics of graphics pipeline 103.

Figure 3B:
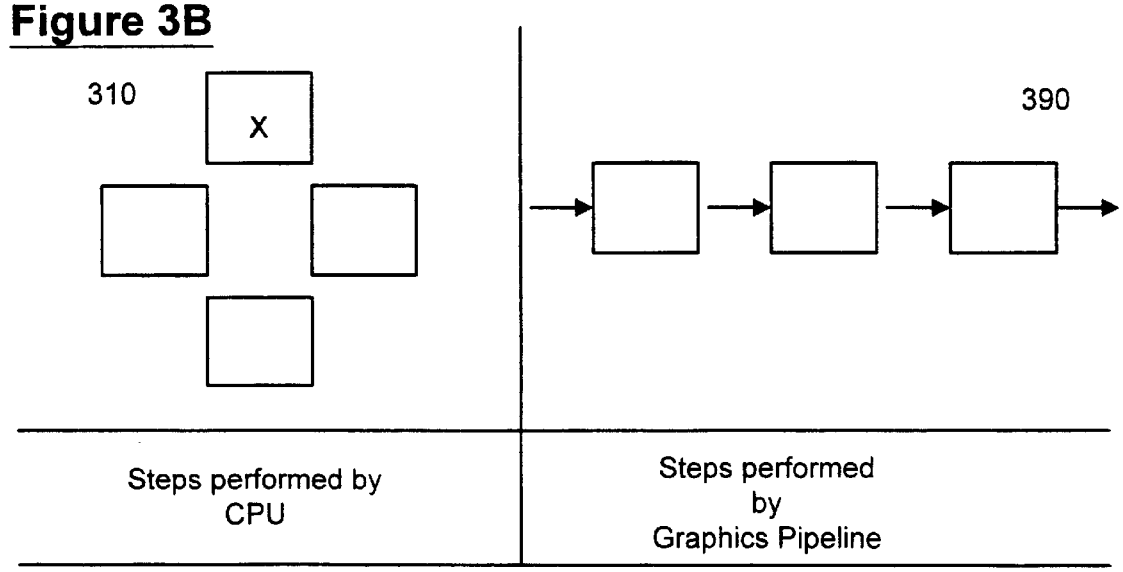
FIG. 3B depicts one arrangement option of the computer graphics system for performing a processing step.
Figure 3C:
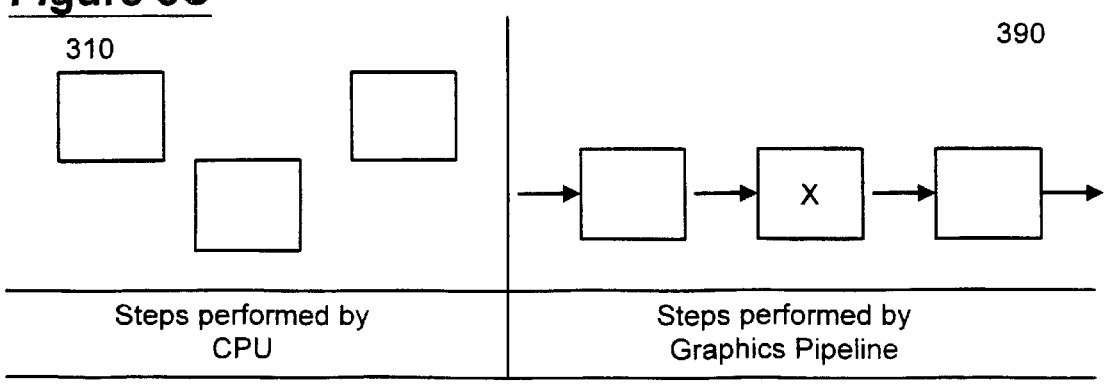
FIG. 3C depicts another arrangement option of the computer graphics system for performing a processing step.

With reference now to FIGS. 3B–C, the issue of assigning steps to be performed by CPU 101 or graphics pipeline 103 is discussed. Specifically, in designing computer graphics system 100, a step X is performed either by CPU 101 or graphics pipeline 103. If step X requires the flexibility of CPU 101 (e.g., a processing step using branching algorithms), then performing step X by CPU 101 (as depicted in FIG. 3B) would have been a better choice than performing step X by graphics pipeline 103. On the other hand, if step X is well suited to the forward flow processing model of graphics pipeline 103 (e.g., a processing step using matrix multiplication), performing step X by graphics pipeline 103 (as depicted in FIG. 3C) would have been a better choice than performing step X by CPU 101. All in all, arranging processing steps in accordance to the strengths of CPU 101 and graphics pipeline 103 can advantageously increase the overall throughput of computer graphics system 100.

Prior Art Approaches

With reference to FIG. 4A, the assignment of steps for one prior art approach is depicted. According to FIG. 4A, MVP 202, clip-checking 204, clipping 206, perspective divide 208 and viewport transformation 210 are assigned to be performed by the graphics pipeline.

Specifically, referring now FIG. 4B, from the standpoint of a piece of graphics data processed by computer graphics system 100, MVP 202 is performed prior to clip-checking 204. Also, if clipping 206 is ever performed, clip-checking 204 is performed prior to clipping 206. Both clip-checking 204 and clipping 206 are performed prior to perspective divide 208.

Figure 5A:
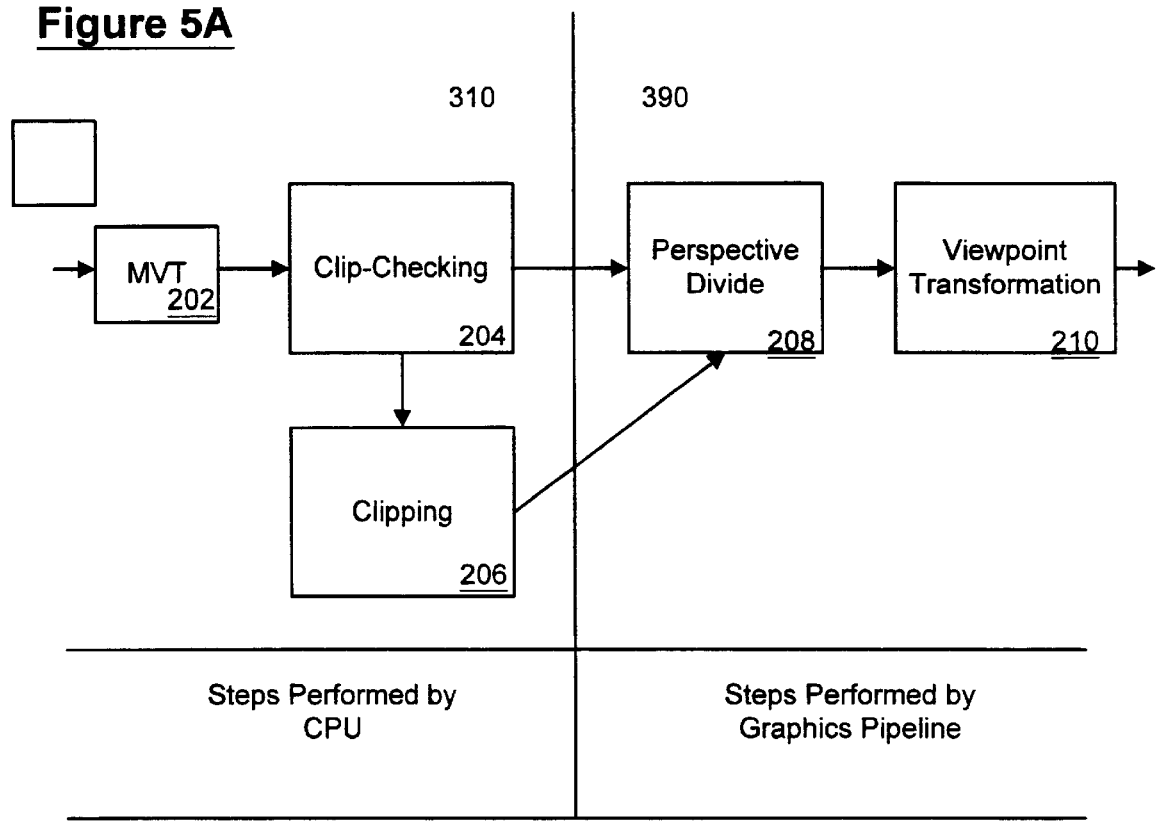
FIG. 5A depicts the design of another prior art approach.

With reference to FIG. 5A, the assignment of steps for another prior art approach is depicted. According to FIG. 5A, MVP 202, clip-checking 204, clipping 206 are performed by CPU 101 rather than performed by graphics pipeline 103, while perspective divide 208 and viewport transformation 210 are still performed by graphics pipeline 103.

Figure 5B:
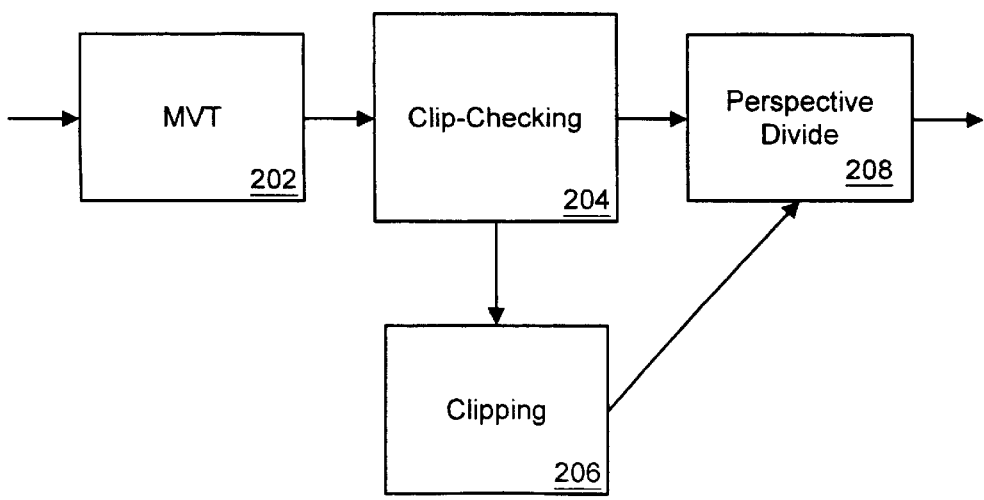
FIG. 5B depicts a specific local arrangement of processing steps in accordance with the prior art approach of FIG. 5A.

Specifically, referring now to FIG. 5B, from the standpoint of a piece of graphics data processed by computer graphics system 100, MVP 202 is performed prior to clip-checking 204. Also, if clipping 206 is ever performed, clip-checking 204 is performed prior to clipping 206. Both clip-checking 204 and clipping 206 are performed prior to perspective divide 208.

Referring now to both FIGS. 4B and 5B, the ordering relation remains the same among MVP 202, clip-checking 204, clipping 206 and perspective divide 208, despite different assignments (to CPU 101 and graphics pipeline 103) of steps in both prior art approaches as depicted in FIGS. 4A and 5A. Importantly, this specific ordering remains the same in both prior art approaches (cf. FIGS. 4B and 5B) because both prior art approaches adapt and rely on the same theoretical underpinning to support clip-checking 204. That is to say, although the two prior art approaches adapt different clip-checking implementations, both prior art approaches rely on the same local ordering relation of clip-checking 204 with respect to MVP 202, clipping 206 and perspective divide 208. This is one of the insights drawn on by the present invention to solve the problems of the prior art approaches.

Object Space, Clip Space, Frustum and Clip-checking

The local ordering of MVP 202, clip-checking 204, clipping 206 and perspective divide 208 (depicted in both FIGS. 4B and 5B) stems from the theory behind clip-checking. The reason why both prior art approaches have the same ordering of these steps (202, 204, 206 and 208) is that mathematical operation of clip-checking is simple to perform in a clip space. However, in order to perform within the clip space, transformations such as MVP 202 would need to be performed on the object space first in order to create the clip space. The theory of clip-checking as relied upon by both prior art approaches is discussed next in FIGS. 6 and 7A–B.

Figure 6:
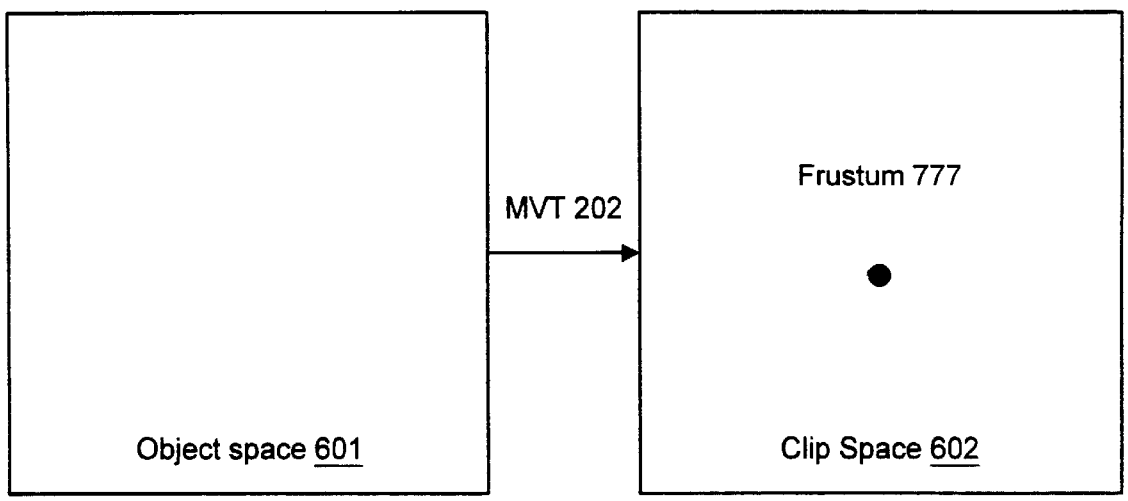
FIG. 6 depicts the relation among an object space, a clip space, MVP (model view projection), and a frustum.

Referring now to FIG. 6, the relation among an object space 601, a clip space 602 and MVP 202 is depicted schematically. The function of performing MVP 202 by computer graphics system 100—either by CPU 101 or graphics pipeline 103—is to transform three dimensional graphics data represented in object coordinates of object space 601 into three dimensional graphics data represented in clip coordinates of clip space 602. Having three dimensional graphics data represented in clip space 602 simplifies mathematical operations of clip-checking 204. Clip space 602 is used such that a frustum of a view volume in clip coordinates is shaped as a cube. In so doing, mathematical operations involved in clip-checking 204 is simple to perform against this cube shaped frustum in clip coordinates of clip space 602.

Figure 7A:
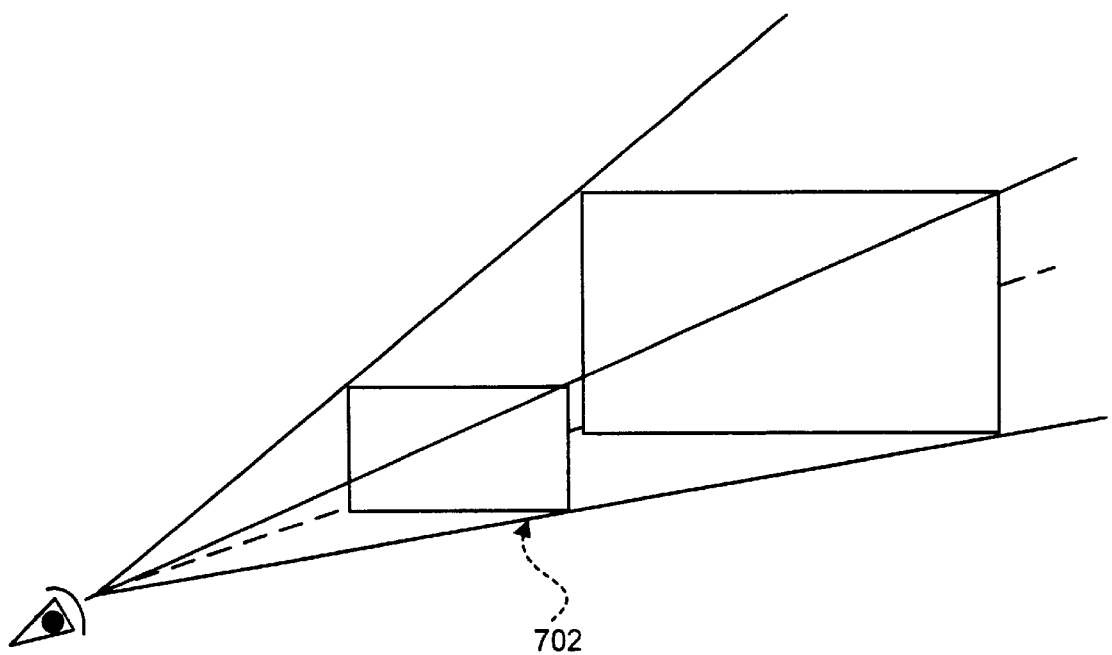
FIG. 7A depicts a typical frustum in relation with a view volume.

In particular, FIG. 7A shows a typical frustum 720 of a view volume 730 for a viewer. Notice that frustum 720 shaped as a truncated pyramid. Frustum 720 is not well suited for performing clip-checking 204 on a geometry because frustum 720 does not have many symmetries. That is to say, not all boundary planes of frustum 720 can be parallel to coordinate planes (the x-y plane, the y-z plane and the z-x plane). Thus, when clip-checking any geometry against frustum 720, no simple set of inequalities can be used for clip-checking the geometry.

Figure 7B:
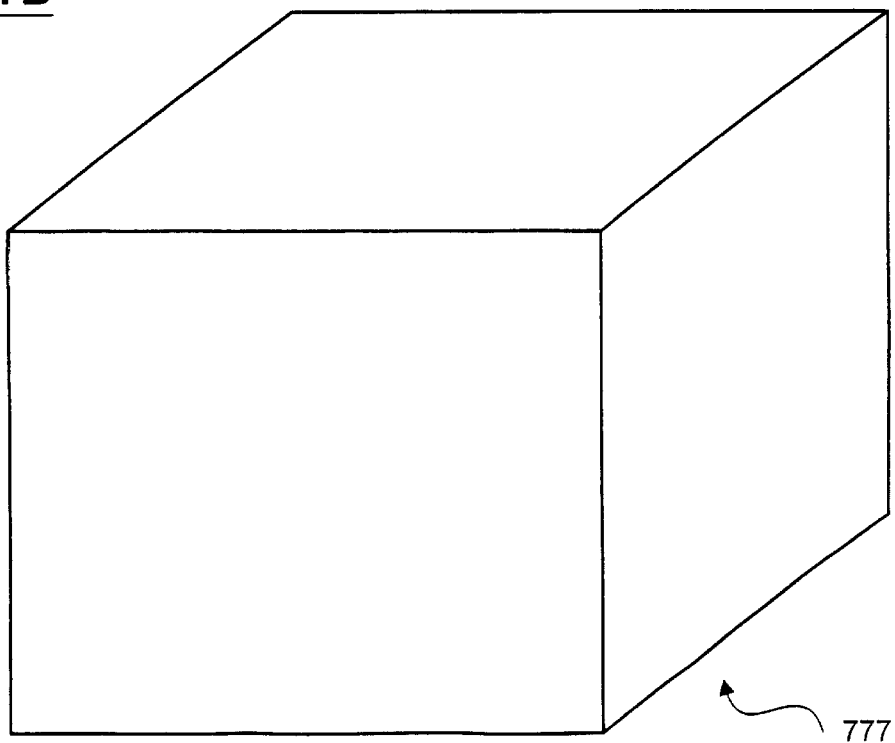
FIG. 7B depicts a frustum in the clip space according to the prior art approaches.

On the other hand, FIG. 7B shows a frustum 777 in clip space 602. Here, clip space 602 is specified with the foresight so that once object space 601 is transformed by MVP 202 into clip space 602, frustum 777 with clip space 602 is shaped as a cube. In so doing, frustum 777 is well suited for performing clip-checking 204 on any geometry because a cube shaped object possesses many symmetries which in turn simplify the mathematical operations involved in clip-checking 204. That is to say, all boundary planes of frustum 777 can be simultaneously oriented to be parallel to either one of coordinate planes (the x-y plane, the y-x plane and the z-x plane). Thus, a simple set of inequalities can be used for clip-checking the geometry.

Thus, by relying on the same clip-checking methodology as shown in FIGS. 6, 7A–B, prior art approaches (depicted in FIGS. 4A and 5A) arrange the same order of performing MVP 202, clip-checking 204, clipping 206 and perspective divide 208 (cf. FIGS. 4B and 5B).

The Present Invention

The present invention is drawn to a system and a method for performing clip-checking. The present invention starts in part from the above insight that both prior art approaches arrange MVP 202, clip-checking 204, clipping 206 and perspective divide 208 in the same performing order because these approaches rely on the same theory of clip-checking. The present invention takes a departure from the above theory relied upon by the prior art approaches.

Specifically, the present invention performs clip-checking in object space 601 rather than clip space 602. In so doing, the present invention is not limited to the aforementioned arrangement of both prior art approaches for performing MVP 202, clip-checking 204, clipping 206 and perspective divide 208. Also, in so doing, unlike the prior art, the present invention utilizes the strength of the CPU while avoiding the weakness of the CPU. Moreover, the present. invention utilizes the strength of the graphics pipeline while avoiding the weakness of the pipeline.

Figure 8A:
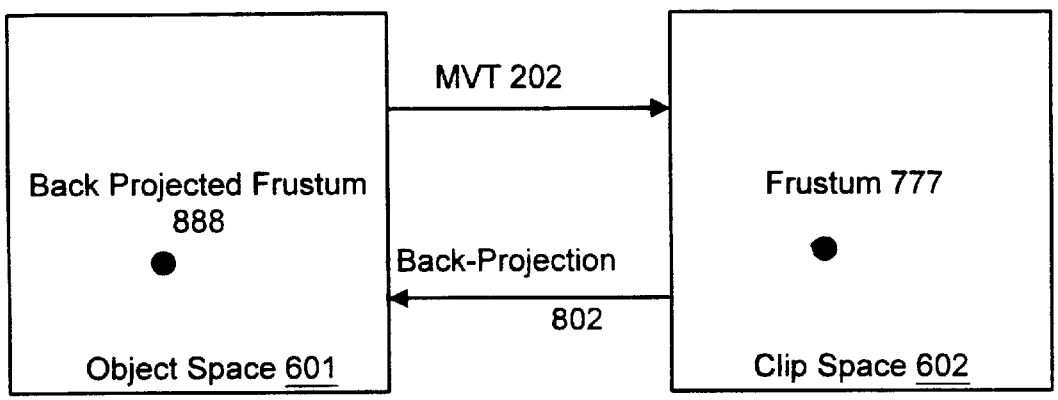
FIG. 8A depicts the relation among an object space, a clip space, MVP, back projection, a frustum and a back projected frustum in accordance with one embodiment of the present invention.

Referring now to FIG. 8A, one embodiment of the present invention is depicted. As depicted in FIG. 8A, clip space 602 and frustum 777 within clip space 602 are back projected. Clip space 602 and frustum 777 are back projected respectively into object space 601 and back projected frustum 888 within object space 601. In the present embodiment, clip-checking 204 is performed in the context of object space 601 rather than in the context of clip space 602.

Figure 8B:
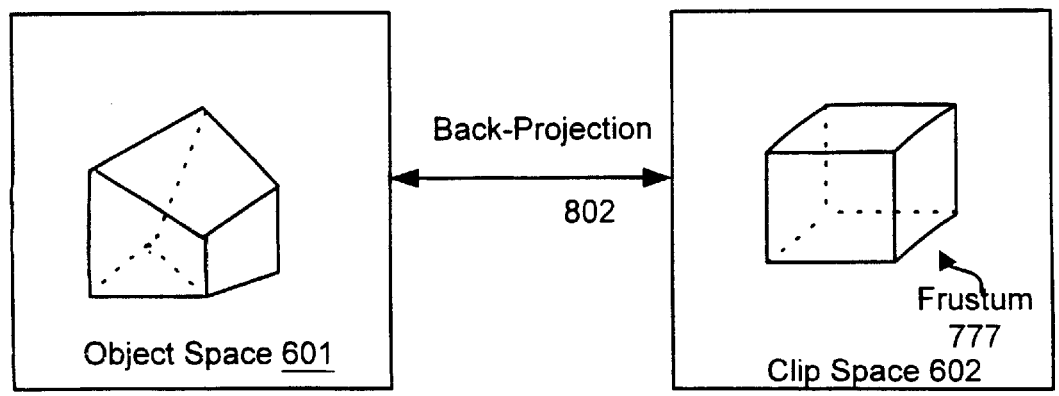
FIG. 8B depicts an exemplary back projected frustum situated within the object space in accordance with one embodiment of the present invention.

However, referring now to FIG. 8B, clip-checking 204 is not performed against back projected frustum 888 because back projected frustum 888 is typically deformed. Back projected frustum 888 is typically not of a regular cube shape as that of frustum 777 within clip space 602. As illustrated, back projected frustum 888 is a deformation of a cube. Typically, none of boundary planes of back projected frustum 888 is likely to be parallel to any coordinate plane. Thus, back projected frustum 888 loses symmetric shape that would have simplified mathematical operations involved in clip-checking 204. Nevertheless, the present invention is still able to simplify mathematical operations of clip-checking- by using a regularized volume as the clip volume reference in the object space.

Figure 9:
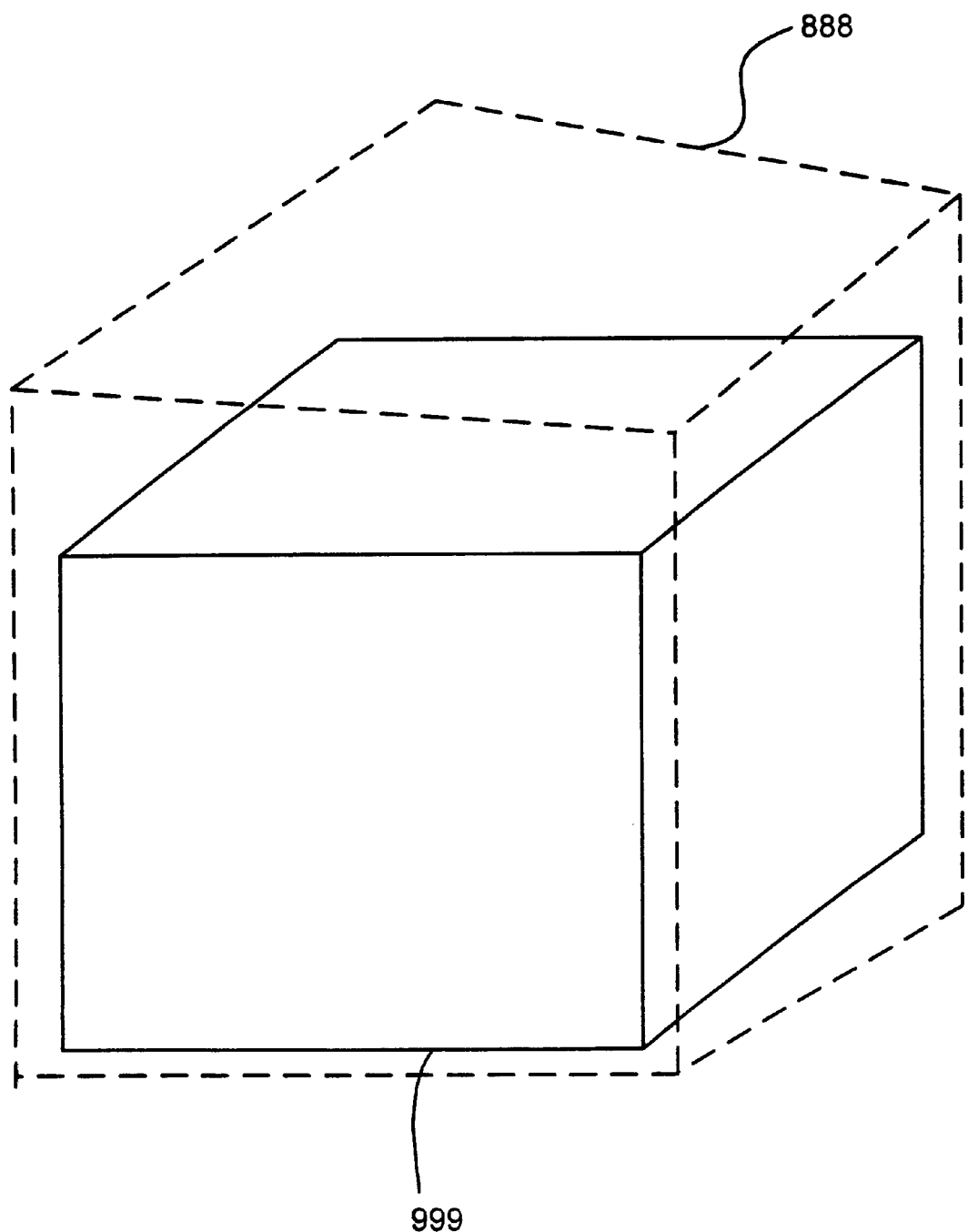
FIG. 9 depicts a regularized volume contained within the exemplary back projected frustum according to one embodiment of the present invention.

Referring now to FIG. 9, a regularized volume 999 is illustrated as enclosed inside back projected frustum 888. Rather than using back projected frustum 888 as the clip volume, regularized volume 999 is used as new standard of reference for clip-checking 204 in object space 601. In the present embodiment of the present invention, regularized volume 999 approximates back projected frustum 888. In particular, regularized volume 999 is fitted inside of back projected frustum 888 such that regularized volume 999 occupies maximum space inside of back projected frustum 888. Moreover, regularized volume 999 is regularized such that mathematical operations involve in clip-checking 204 is simplified as is the case for frustum 777 within clip space 602. That is, regularized volume 999 possesses the same quality as frustum 777 within clip space 602 in that mathematical operations involved in clip-checking 204 is advantageously simplified. Specifically, frustum 777 simplifies mathematical operations of clip-checking within clip space 602 while regularized volume 999 simplifies mathematical operations of clip-checking within object space 601.

In one embodiment of the present invention, regularized volume 999 enclosed within back projected frustum 888 is shaped as rectangular parallelepiped. However, in some other embodiment, regularized volume 999 enclosed within back projected frustum 888 shaped other than a rectangular parallelepiped is used. Moreover, in yet still some other embodiments, clip-checking 204 performed in the context of object space 601 does not require any regularized volume 999.

Furthermore, in yet another embodiment, regularized volume 999 need not be confined entirely within back projected frustum 888. Rather, regularized volume 999 can be a minimum-sized regularized volume that encompasses back projected frustum 888. In particular, hardware support is needed to cull away any graphic object lying between the boundary of back projected frustum 888 and the boundary of regularized volume 999. In so doing, the culled away graphic objects will not be passed further into the pipeline for unnecessary processing. Thus, graphic pipeline performance is improved.

Figure 10A:
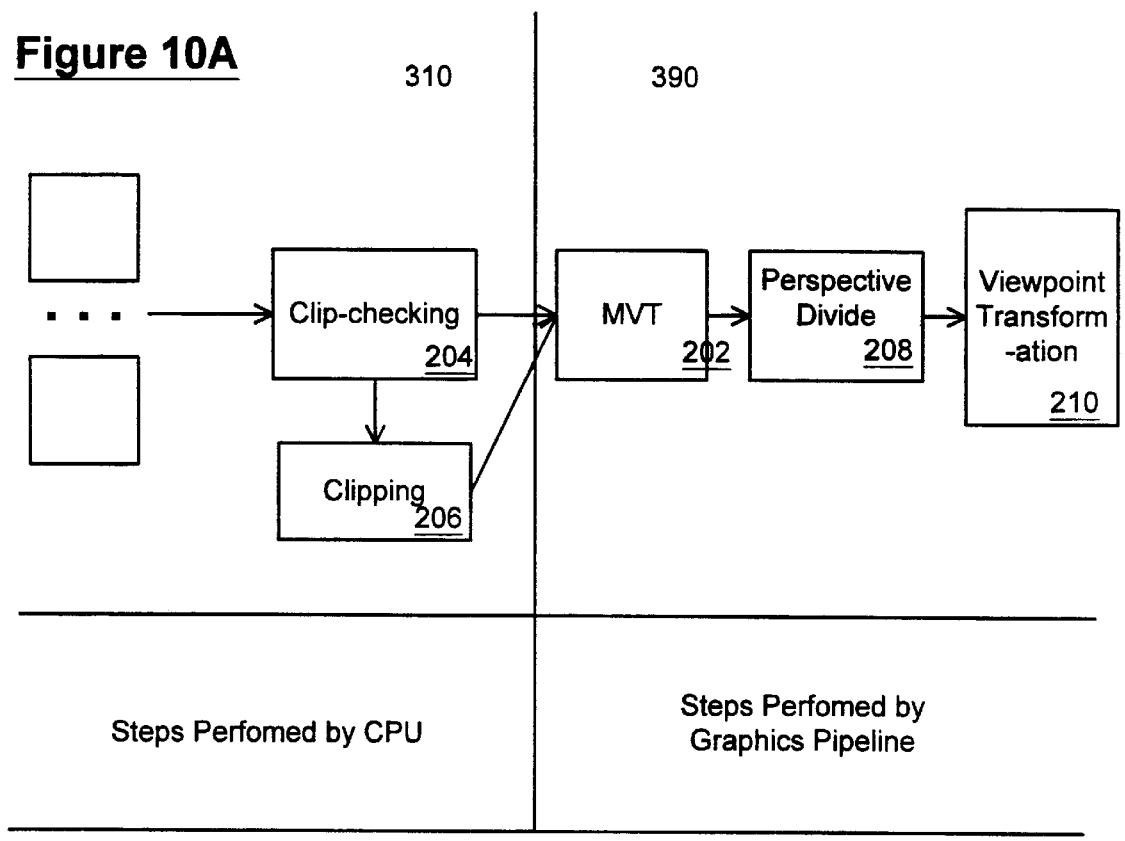
FIG. 10A depicts the arrangement of processing steps according to one embodiment of the present invention.
Figure 10B:
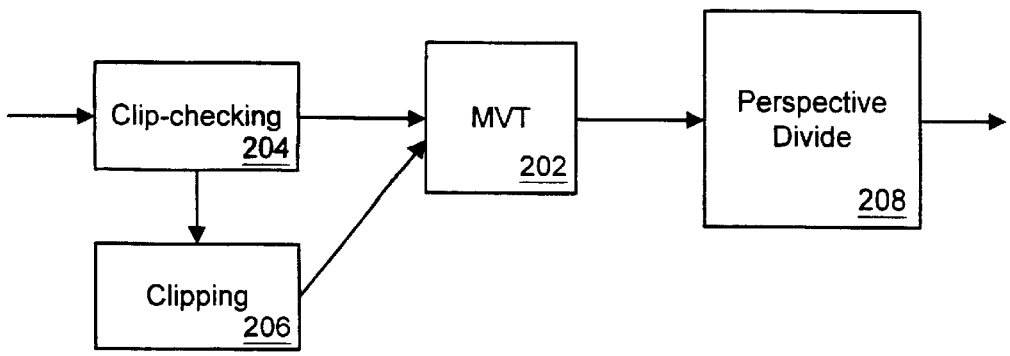
FIG. 10B depicts the arrangement of processing steps according to one embodiment of the present invention.

Referring now to FIG. 10A, the arrangement of graphics processing steps are depicted according to one embodiment of the present invention. Because clip-checking 204 is performed in the context of object space 601 rather than in the context of clip space 602, the division of labor between CPU 101 and graphics pipeline 103 is distinctly different from prior art approaches to better harness the processing capability of computer graphics system 100. Specifically, referring to FIG. 10B in view of FIGS. 4B and 5B, the ordering of steps 202, 204, 206 and 208 has been changed in the present embodiment. In so doing, as will be explained next, throughput of computer graphics system 100 is advantageously increased.

Referring back to FIG. 10A, for example, on the one hand, clip-checking 204 and clipping 206 are performed by CPU 101. In so doing, branching behaviors of algorithms for clip-checking 204 and clipping 206 do not disrupt forward flow of graphics pipeline 103. Moreover, in so doing, when clipping 206 is performed by CPU 101, culled away graphic objects are removed from being processed unnecessarily in graphics pipeline 103. Performance of graphics pipeline 103 is thus improved.

Referring still to FIG. 10A, on the other hand, MVP 202, perspective divide 208 and viewport transformation 210 are performed by graphics pipeline 103. In particular, because clip-checking 204 is performed in the context of object space 601, MVP 202 need not be performed prior to clip-checking 204 to transform object space 601 into clip space 602. Thus, in the present embodiment, MVP 202 is performed by graphics pipeline 103 after CPU 101 performs clip-checking 204 and clipping 206. In so doing, CPU 101 is not over-burdened with MVP 202, which is not well suited for CPU 101. Instead, MVP 202 is particularly well suited for forward flow of graphics pipeline 103. Thus, by performing MVP 202 by graphics pipeline 103, the present invention takes advantage of the strength—forward flow—of graphics pipeline 103. Consequently, throughput of computer graphics system 100 is advantageously increased.

Figure 11:
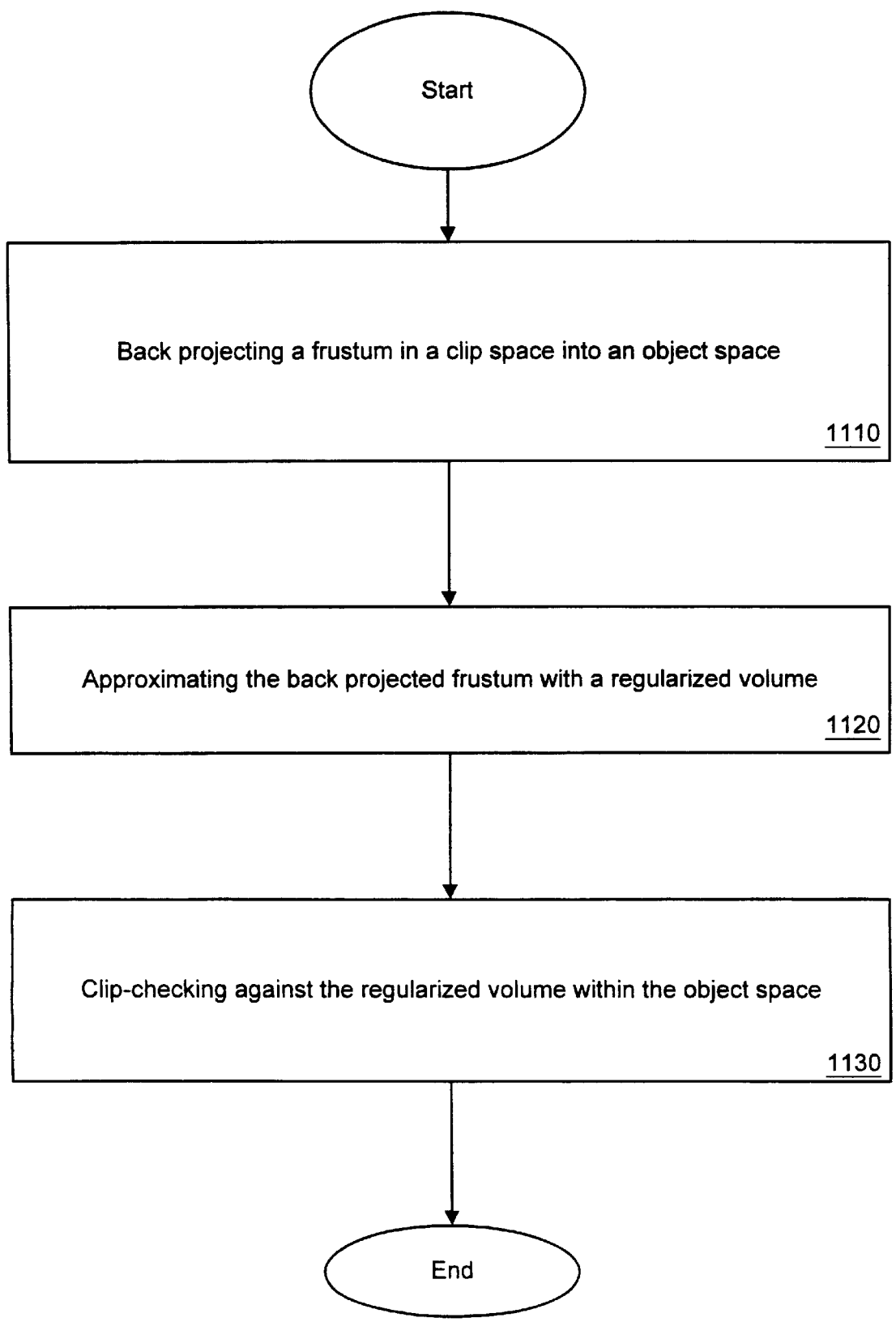
FIG. 11 is a flow chart for one embodiment of the present invention.

FIG. 11 shows a flowchart for one embodiment of the present invention. In step 1110, a frustum in a clip space is back projected into an object space. Step 1110 is one place where the present invention departs from prior art approaches. With step 1110, the present invention sets the stage for more efficiently harnessing the computer graphics system than is possible in the prior art approaches. As such, processing steps such as MVP, clip-checking, clipping are performed in an order which takes full advantage of the computer graphics system.

In step 1120, a regularized volume is introduced to approximate the back projected frustum. Specifically, the frustum within the clip space is shaped as a cube. This frustum simplifies clip-checking because mathematical operations of clip-checking become checking coordinates of a geometry against few simple mathematical inequalities. In contrast, this regularized volume is used instead of the back projected frustum because the back projected frustum turns out not well suited for clip-checking.

Specifically, the back projected frustum is typically a deformed cube whose edges do not form perpendicular angles with each other. As such, the back projected frustum typically does not possess the symmetry of having its boundary planes simultaneously parallel to coordinate planes. The mathematical operations involved in clip-checking against the back projected frustum are no longer simple set of inequalities anymore. Thus, the back projected frustum is not well suited for being a clip volume reference against which to clip-checking a given geometry. However, by fitting a regularized volume (possessing the pertinent symmetry) within the back projected frustum to replace the back projected frustum as the clip volume reference for clip-checking, mathematical simplification becomes possible. In particular, mathematical operations involved in clip-checking—again like that of clip-checking in the clip space—become checking coordinates of a given geometry against few simple mathematical inequalities.

In step 1130, clip-checking is performed against the regularized volume enclosed inside the back projected frustum. Specifically, clip-checking is performed in the context of the object space rather than in the context of the clip space. In so doing, the present invention enables processing steps such as MVP, clip-checking and clipping to be performed in the order that best harness the capability of the computer graphics system.

Figure 12:
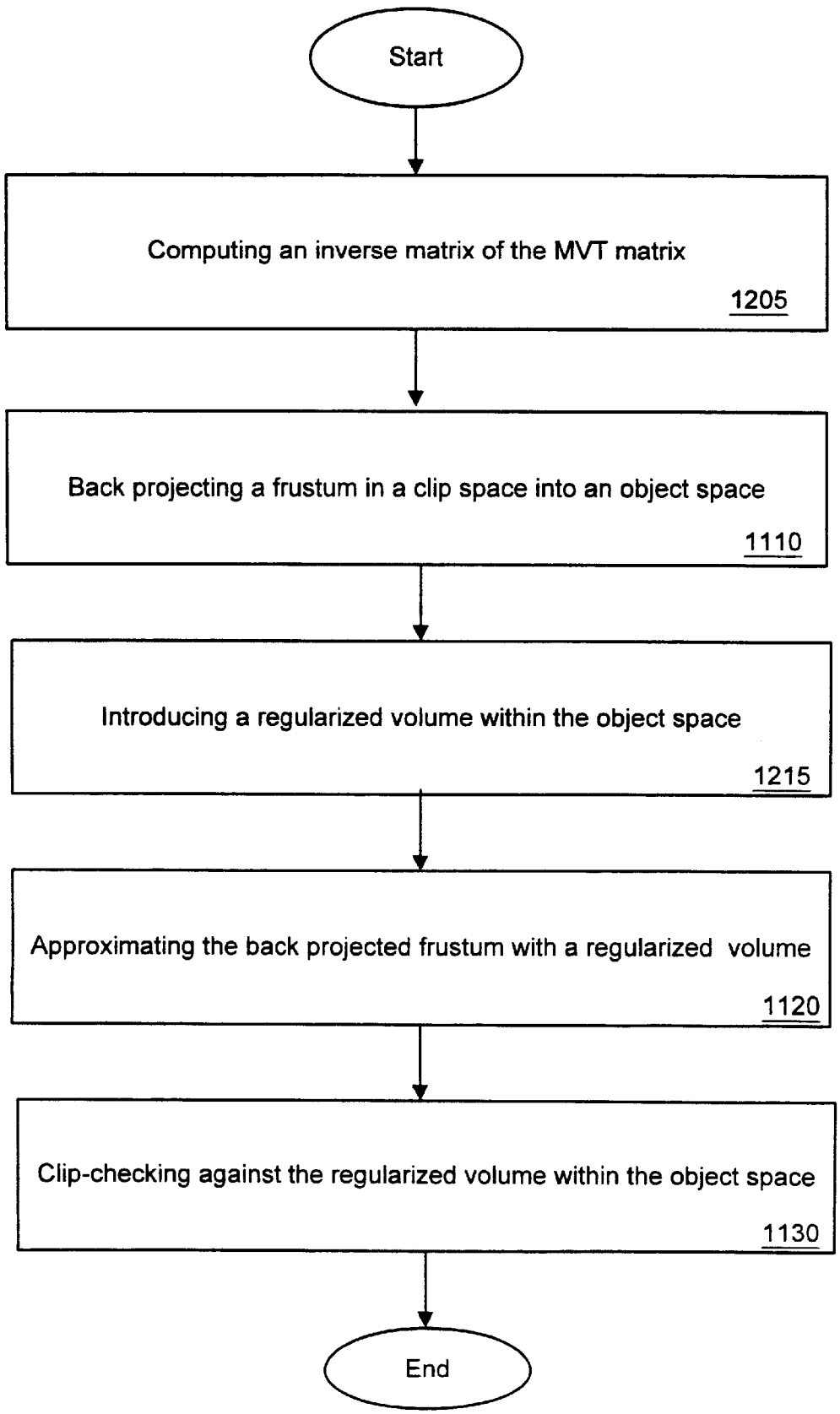
FIG. 12 is a flow chart for another embodiment of the present invention.

Referring now to FIG. 12, a flowchart is shown for one embodiment of the present invention. In step 1205, an inverse matrix of the MVP matrix is computed through well known procedures. Once the inverse matrix of the MVP matrix is computed, this inverse matrix is used to represent the back projection that will take place in the next step, step 1110.

In step 1110, a frustum in a clip space is back projected into an object space. Specifically, the back projection is implemented by having the inverse matrix (previously computed in step 1205) operate on the clip space. Typically, the back projected frustum is not of a regularized shape like that of a cube. As such, mathematical operations involved in clip-checking that is eventually to occur typically become cumbersome. Thus, in the next step, step 1215, a regularized volume is introduced to simplify clip-checking within the object space.

In step 1215, the CPU introduces a regularized volume occupying the maximal volume possible within the back projected frustum. Then in step 1120, this regularized volume is fitted by the CPU inside of the back projected frustum to approximate the back projected frustum. As such, this regularized volume is utilized as the clip volume reference within the object space. In so doing, the mathematical operations involved in clip-checking is simplified to a small set of inequalities.

In step 1130, clip-checking is performed on a geometry against the regularized volume enclosed inside the back projected frustum. Most of the time, no clipping is required of the geometry, so the geometry is passed on to MVP then perspective divide and so on by the graphics pipeline. However, in the case where clipping is needed, the geometry is passed on for clipping to be performed by the CPU. Once clipping is performed, the geometry is passed on to the graphics pipeline for MVP, then perspective divide and so on. Specifically, clipping the geometry by the CPU occurs before MVP is performed.

In summary, the present invention performs view volume clip-check within an object space rather than within a clip space. The present invention also utilizes a regularized volume as the clip volume reference within the object space. Advantageously, performing clip-checking in the object space rather than in the clip space enables optimal arrangement of graphics processing steps for increasing throughput of the computer graphics system. Also advantageously, replacing the back projected frustum by a regularized volume as the clip volume reference simplifies mathematical operations involved in clip-checking within the object space. In so doing, the present invention performs view volume clip-check without disrupting forward flow of the graphic pipeline. Moreover, the present invention performs view volume clip-check without wasting bus bandwidth. Furthermore, the present invention performs view volume clip-check without over-burdening the CPU. Further yet still, the present invention performs view volume clip-check without underutilizing the graphic pipeline. Finally, while not in the context of the clip space, the present invention retains the mathematical simplicity of clip-checking even though clip-checking is performed within the context of the object space.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. The scope of the invention is intended to be defined by the Claims appended hereto and their equivalents.

What is claimed is:

1. A computer-implemented method for performing view volume clip-check for generating an image, said method comprising the steps of:
   a) back projecting a frustum of a clip space into a back projected frustum within an object space;
   b) approximating said back projected frustum of said object space by a regularized volume of said object space; and
   c) clip-checking within said object space against said regularized volume within said object space.

2. The method of claim 1, wherein said frustum of said clip space is shaped as a cube.

3. The method of claim 1, wherein said step a) is further comprised of:
   a1) finding an inverse matrix of a matrix which represents MVP (model view projection) transformation; and
   a2) operating by said inverse matrix on said clip space and said frustum in clip coordinates within said clip space to obtain said back projected frustum in object coordinates within said object space.

4. The method of claim 1, wherein in said step b) said regularized volume is a rectangular parallelpiped occupying maximal volume possible within said back projected frustum such that mathematical operations of clip-checking in said step c) are simplified.

5. The method of claim 1, wherein said step c) is implemented without having to first perform MVP transformation.

6. The method of claim 1, wherein said step a) is performed by a CPU (central processing unit) rather than by a graphics pipeline.

7. The method of claim 1, wherein said step b) is performed by a CPU rather than by a graphics pipeline.

8. The method of claim 1, wherein said step c) is performed by a CPU rather than by a graphics pipeline.

9. A computer graphics system for performing view volume clip-check, wherein a memory of said computer graphics system stores therein a computer program which causes said computer graphics system to perform the steps of:
   a) back projecting a frustum of a clip space into a back projected frustum within an object space;
   b) approximating said back projected frustum within said object space with a regularized volume within said object space; and
   c) clip-checking against said regularized volume, said regularized volume utilized as a clip volume within said object space.

10. The system of claim 9, wherein said frustum of said clip space is shaped as a cube.

11. The system of claim 9, wherein said step a) is further comprised of:
   a1) finding an inverse matrix of a matrix which represents MVP (model view projection) transformation; and
   a2) operating by said inverse matrix on said clip space and said frustum in clip coordinates within said clip space to obtain said back projected frustum in object coordinates within said object space.

12. The system of claim 9, wherein in said step b) said regularized volume is a rectangular parallelpiped occupying maximal volume possible within said back projected frustum such that mathematical operations of clip-checking in said step c) are simplified.

13. The system of claim 9, wherein said step c) is implemented without having to first perform MVP transformation.

14. The system of claim 9, wherein said step a) is performed by a CPU (central processing unit) rather than by a graphics pipeline.

15. The system of claim 9, wherein said step b) is performed by a CPU rather than by a graphics pipeline.

16. The system of claim 9, wherein said step c) is performed by a CPU rather than by a graphics pipeline.

17. A computer graphic system for performing view volume clip-check, said computer graphic system comprising:
   a CPU adapted to perform the steps comprising of:
      a) back projecting a frustum of a clip space into a back projected frustum of an object space;
      b) approximating said back projected frustum within said object space with a regularized volume with said object space; and
      c) clip-checking geometry against said regularized volume as a clip volume within said object space.

18. The system of claim 17, wherein said frustum of said clip space is shaped as a cube.

19. The system of claim 17, wherein said step a) is further comprised of:
   a1) finding an inverse matrix of a matrix which represents MVP (model view projection) transformation; and
   a2) operating by said inverse matrix on said clip space and said frustum in clip coordinates within said clip space to obtain said back projected frustum in object coordinates within said object space.

20. The system of claim 17, wherein in said step b) said regularized volume is a rectangular parallelpiped occupying maximal volume possible within said back projected frustum such that mathematical operations of clip-checking in said step c) are simplified.

21. The system of claim 17, wherein said step c) is implemented without having to first perform MVP transformation.

22. The system of claim 17, wherein said computer graphic system is further comprised of:
   a graphics pipeline coupled to said CPU, said graphics pipeline adapted to perform the steps comprising of:
      d) perspective divide; and
      e) viewport transformation.

* * * * *

UNITED STATES PATENT AND TRADEMARK OFFICE
CERTIFICATE OF CORRECTION

PATENT NO. : 6,545,679 B1
DATED : April 8, 2003
INVENTOR(S) : Hussain et al.

It is certified that error appears in the above-identified patent and that said Letters Patent is hereby corrected as shown below:

Drawings,
Figures 4A, 4B, 5A and 5B, please insert the Legend -- Prior Art --;

Column 7,
Line 51, please delete "." after the word "present";

Signed and Sealed this

Ninth Day of November, 2004

JON W. DUDAS
*Director of the United States Patent and Trademark Office*